US010926855B2

(12) United States Patent
Derginer et al.

(10) Patent No.: US 10,926,855 B2
(45) Date of Patent: Feb. 23, 2021

(54) METHODS AND SYSTEMS FOR CONTROLLING LOW-SPEED PROPULSION OF A MARINE VESSEL

(71) Applicant: Brunswick Corporation, Mettawa, IL (US)

(72) Inventors: Matthew Eric Derginer, Butte des Mort, WI (US); Aaron J. Ward, Oshkosh, WI (US); Travis C. Malouf, Oconomowoc, WI (US)

(73) Assignee: Brunswick Corporation, Mettawa, IL (US)

( * ) Notice: Subject to any disclaimer, the term of this patent is extended or adjusted under 35 U.S.C. 154(b) by 1 day.

(21) Appl. No.: 16/178,261

(22) Filed: Nov. 1, 2018

(65) Prior Publication Data

US 2020/0140052 A1 May 7, 2020

(51) Int. Cl.
*B63H 21/21* (2006.01)
*B63H 20/12* (2006.01)
(Continued)

(52) U.S. Cl.
CPC ............. *B63H 21/21* (2013.01); *B63H 20/12* (2013.01); *B63H 21/213* (2013.01);
(Continued)

(58) Field of Classification Search
CPC ............................. B63H 21/21; G05D 1/0206
See application file for complete search history.

(56) References Cited

U.S. PATENT DOCUMENTS 3,688,252 A 8/1972 Thompson
3,715,571 A 2/1973 Braddon
(Continued)

FOREIGN PATENT DOCUMENTS

CA 2279165 1/2001
CA 2282064 1/2001
(Continued)

OTHER PUBLICATIONS

Poorman et al., "Multilayer Control System and Method for Controlling Movement of a Marine Vessel", Unpublished U.S. Appl. No. 11/965,583, filed Dec. 27, 2007.
(Continued)

*Primary Examiner* — Anne Marie Antonucci
*Assistant Examiner* — Abdalla A Khaled
(74) *Attorney, Agent, or Firm* — Andrus Intellectual Property Law, LLP

(57) ABSTRACT

A method for controlling low-speed propulsion of a marine vessel powered by a marine propulsion system having a plurality of propulsion devices includes receiving a signal indicating a position of a manually operable input device movable to indicate desired vessel movement within three degrees of freedom, and associating the position of the manually operable input device with a desired inertial velocity of the marine vessel. A steering position command and an engine command are then determined for each of the plurality of propulsion devices based on the desired inertial velocity and the propulsion system is controlled accordingly. An actual velocity of the marine vessel is measured and a difference between the desired inertial velocity and the actual velocity is determined, where the difference is used as feedback in subsequent steering position command and engine command determinations.

18 Claims, 7 Drawing Sheets

(51) Int. Cl.
*G05D 1/02* (2020.01)
*G05D 1/08* (2006.01)
*B63H 20/00* (2006.01)

(52) U.S. Cl.
CPC ......... *G05D 1/0206* (2013.01); *G05D 1/0875* (2013.01); *B63H 2020/003* (2013.01); *B63H 2021/216* (2013.01)

(56) References Cited

U.S. PATENT DOCUMENTS

| | | | |
|---|---|---|---|
| 3,771,483 A | 11/1973 | Spencer | |
| 4,253,149 A | 2/1981 | Cunningham et al. | |
| 4,428,052 A | 1/1984 | Robinson et al. | |
| 4,513,378 A | 4/1985 | Antkowiak | |
| 4,939,661 A | 7/1990 | Barker et al. | |
| 4,975,709 A | 12/1990 | Koike | |
| 5,172,324 A | 12/1992 | Knight | |
| 5,202,835 A | 4/1993 | Knight | |
| 5,331,558 A | 7/1994 | Hossfield et al. | |
| 5,362,263 A | 11/1994 | Petty | |
| 5,386,368 A | 1/1995 | Knight | |
| 5,390,125 A | 2/1995 | Sennott et al. | |
| 5,491,636 A | 2/1996 | Robertson et al. | |
| 5,736,962 A | 4/1998 | Tendler | |
| 5,884,213 A | 3/1999 | Carlson | |
| 6,059,226 A | 5/2000 | Cotton et al. | |
| 6,092,007 A | 7/2000 | Cotton et al. | |
| 6,230,642 B1 | 5/2001 | McKenney et al. | |
| 6,234,100 B1 | 5/2001 | Fadeley et al. | |
| 6,308,651 B2 | 10/2001 | McKenney et al. | |
| 6,377,889 B1 | 4/2002 | Soest | |
| 6,446,003 B1 | 9/2002 | Green et al. | |
| 6,485,341 B1 | 11/2002 | Lanyi et al. | |
| 6,604,479 B2 | 8/2003 | McKenney et al. | |
| 6,678,589 B2 | 1/2004 | Robertson et al. | |
| 6,705,907 B1 | 3/2004 | Hedlund | |
| 6,995,527 B2 | 2/2006 | Depasqua | |
| 7,268,703 B1 | 9/2007 | Kabel et al. | |
| 7,366,593 B2 | 4/2008 | Fujimoto et al. | |
| 7,398,742 B1 | 7/2008 | Gonring | |
| 7,416,458 B2 | 8/2008 | Suemori et al. | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,577,526 B2 | 8/2009 | Kim et al. | |
| 7,727,036 B1 | 6/2010 | Poorman et al. | |
| 7,813,844 B2 | 10/2010 | Gensler et al. | |
| 7,876,430 B2 | 1/2011 | Montgomery | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 * | 3/2012 | Rae .................. | B63H 25/04 701/21 |
| 8,155,811 B2 | 4/2012 | Noffsinger et al. | |
| 8,265,812 B2 | 9/2012 | Pease | |
| 8,417,399 B2 | 4/2013 | Arbuckle et al. | |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,797,141 B2 | 8/2014 | Best et al. | |
| 8,831,868 B2 | 9/2014 | Grace et al. | |
| 9,039,468 B1 | 5/2015 | Arbuckle et al. | |
| 9,039,469 B1 | 5/2015 | Calamia et al. | |
| 9,132,900 B2 | 9/2015 | Salmon et al. | |
| 9,162,743 B2 | 10/2015 | Grace et al. | |
| 9,176,215 B2 | 11/2015 | Nikitin et al. | |
| 9,183,711 B2 | 11/2015 | Fiorini et al. | |
| 9,195,234 B2 | 11/2015 | Stephens | |
| 9,248,898 B1 | 2/2016 | Kirchhoff | |
| 9,355,463 B1 | 5/2016 | Arambel et al. | |
| 9,359,057 B1 | 6/2016 | Andrasko et al. | |
| 9,377,780 B1 | 6/2016 | Arbuckle et al. | |
| 9,615,006 B2 | 4/2017 | Terre et al. | |
| 9,650,119 B2 | 5/2017 | Morikami et al. | |
| 9,694,885 B2 | 7/2017 | Combee | |
| 9,729,802 B2 | 8/2017 | Frank et al. | |
| 9,733,645 B1 | 8/2017 | Andrasko et al. | |
| 9,734,583 B2 | 8/2017 | Walker et al. | |
| 9,996,083 B2 | 1/2018 | Vojak | |
| 9,904,293 B1 | 2/2018 | Heap et al. | |
| 9,908,605 B2 | 3/2018 | Hayashi et al. | |
| 9,927,520 B1 | 3/2018 | Ward et al. | |
| 9,988,134 B1 | 6/2018 | Gable et al. | |
| 10,037,701 B2 | 7/2018 | Harnett | |
| 10,048,690 B1 | 8/2018 | Hilbert et al. | |
| 10,055,648 B1 | 8/2018 | Grigsby et al. | |
| 10,106,238 B2 | 10/2018 | Sidki et al. | |
| 10,191,153 B2 | 1/2019 | Gatland | |
| 10,431,099 B2 | 1/2019 | Stewart et al. | |
| 10,281,917 B2 | 5/2019 | Tyers | |
| 10,338,800 B2 | 7/2019 | Rivers et al. | |
| 10,444,349 B2 | 10/2019 | Gatland | |
| 10,507,899 B2 * | 12/2019 | Imamura ................ | B63H 21/21 |
| 2003/0137445 A1 | 7/2003 | Rees et al. | |
| 2004/0221787 A1 | 11/2004 | McKenney et al. | |
| 2005/0075016 A1 | 4/2005 | Bertetti et al. | |
| 2005/0170713 A1 | 8/2005 | Okuyama | |
| 2006/0058929 A1 * | 3/2006 | Fossen ................ | G05B 23/0256 701/21 |
| 2006/0089794 A1 | 4/2006 | Despasqua | |
| 2007/0032923 A1 | 2/2007 | Mossman et al. | |
| 2007/0089660 A1 | 4/2007 | Bradley et al. | |
| 2007/0178779 A1 | 8/2007 | Takada et al. | |
| 2007/0203623 A1 | 8/2007 | Saunders et al. | |
| 2009/0037040 A1 | 2/2009 | Salmon et al. | |
| 2010/0076683 A1 | 3/2010 | Chou | |
| 2011/0153125 A1 | 6/2011 | Arbuckle et al. | |
| 2011/0172858 A1 | 7/2011 | Gustin et al. | |
| 2012/0072059 A1 | 3/2012 | Glaeser | |
| 2012/0248259 A1 | 10/2012 | Page et al. | |
| 2013/0297104 A1 | 11/2013 | Tyers et al. | |
| 2015/0032305 A1 | 1/2015 | Lindeborg | |
| 2015/0089427 A1 | 3/2015 | Akuzawa | |
| 2015/0276923 A1 | 10/2015 | Song et al. | |
| 2015/0346722 A1 | 12/2015 | Herz et al. | |
| 2015/0378361 A1 | 12/2015 | Walker et al. | |
| 2016/0214534 A1 | 7/2016 | Richards et al. | |
| 2017/0176586 A1 | 6/2017 | Johnson et al. | |
| 2017/0205829 A1 | 7/2017 | Tyers | |
| 2017/0253314 A1 | 9/2017 | Ward | |
| 2017/0255201 A1 | 9/2017 | Arbuckle et al. | |
| 2017/0365175 A1 | 12/2017 | Harnett | |
| 2018/0057132 A1 | 3/2018 | Ward et al. | |
| 2018/0081054 A1 | 3/2018 | Rudzinsky et al. | |
| 2018/0259338 A1 | 9/2018 | Stokes et al. | |
| 2018/0259339 A1 | 9/2018 | Johnson et al. | |
| 2019/0251356 A1 | 8/2019 | Rivers | |
| 2019/0258258 A1 | 8/2019 | Tyers | |
| 2019/0283855 A1 * | 9/2019 | Nilsson ................ | B63H 21/265 |

FOREIGN PATENT DOCUMENTS

| | | |
|---|---|---|
| DE | 906907 C | 3/1954 |
| DE | 11 2013 004908 | 6/2015 |
| EP | 0423901 A1 | 4/1991 |
| EP | 1 775 212 | 4/2007 |
| EP | 1873052 A2 | 1/2008 |
| EP | 3 182 155 | 6/2017 |
| GB | 1173442 A | 12/1969 |
| GB | 2180374 A | 3/1987 |
| JP | S58061097 A | 4/1983 |
| JP | H04101206 A | 2/1992 |
| JP | H07223591 A | 8/1995 |
| JP | 2926533 B2 | 7/1997 |
| JP | 7-246998 | 10/1999 |
| JP | 2007248336 A | 9/2007 |

(56) References Cited

FOREIGN PATENT DOCUMENTS

| | | | | |
|---|---|---|---|---|
| JP | 2009227035 | A | | 10/2009 |
| JP | 5042906 | B2 | | 7/2012 |
| JP | 5226355 | B2 | | 7/2013 |
| JP | 2016049903 | | | 4/2016 |
| JP | 2017178242 | | | 10/2017 |
| KR | 20140011245 | | | 1/2014 |
| WO | WO 1992005505 | A1 | | 4/1992 |
| WO | 9305406 | | | 3/1993 |
| WO | 2006040785 | A1 | | 4/2006 |
| WO | 2006 062416 | | | 6/2006 |
| WO | WO 2006058400 | A1 | | 6/2006 |
| WO | 2008066422 | | | 6/2008 |
| WO | WO 2008111249 | A1 | | 8/2008 |
| WO | 2012010818 | | | 1/2012 |
| WO | 2017 095235 | | | 6/2017 |
| WO | WO2019011451 | | * 7/2017 | ............. B63H 20/12 |
| WO | 2017167905 | | | 10/2017 |
| WO | 2017168234 | A1 | | 10/2017 |
| WO | 2018162933 | | | 9/2018 |
| WO | 2018183777 | | | 10/2018 |
| WO | 2018201097 | | | 11/2018 |
| WO | 2018232376 | | | 12/2018 |
| WO | 2018232377 | | | 12/2018 |
| WO | 2018232377 | A1 | | 12/2018 |
| WO | 2019011451 | | | 1/2019 |
| WO | 2019096401 | | | 5/2019 |
| WO | 2019126755 | | | 6/2019 |
| WO | 2019157400 | | | 8/2019 |
| WO | 2019201945 | | | 10/2019 |

OTHER PUBLICATIONS

Mercury Marine, Axius Generation 2 Installation Manual, Jul. 2010, pp. 22-25.

Mercury Marine, Joystick Piloting for Outboards Operation Manual, 2013, pp. 24-26.

Mercury Marine, Zeus 3000 Series Pod Drive Models Operation Manual, 2013, pp. 49-52.

Arbuckle et al., "System and Method for Controlling a Position of a Marine Vessel Near an Object," Unpublished U.S. Appl. No. 15/818,233, filed Nov. 20, 2017.

Arbuckle et al., "System and Method for Controlling a Position of a Marine Vessel Near an Object," Unpublished U.S. Appl. No. 15/818,226, filed Nov. 20, 2017.

Ward et al., "Methods for Controlling Movement of a Marine Vessel Near an Object," Unpublished U.S. Appl. No. 15/986,395, filed May 22, 2018.

Search Report dated Apr. 22, 2020 in counterpart European Patent Application 19205213.2.

John Bayless, Adaptive Control of Joystick Steering in Recreational Boats, Marquette University, Aug. 2017, https://epublications. marquette.edu/cgi/viewcontent.cgi?article=1439&context=theses_ open.

Translation of rejection dated Mar. 3, 2020 in counterpart Japan Patent Application 2019-190603.

* cited by examiner

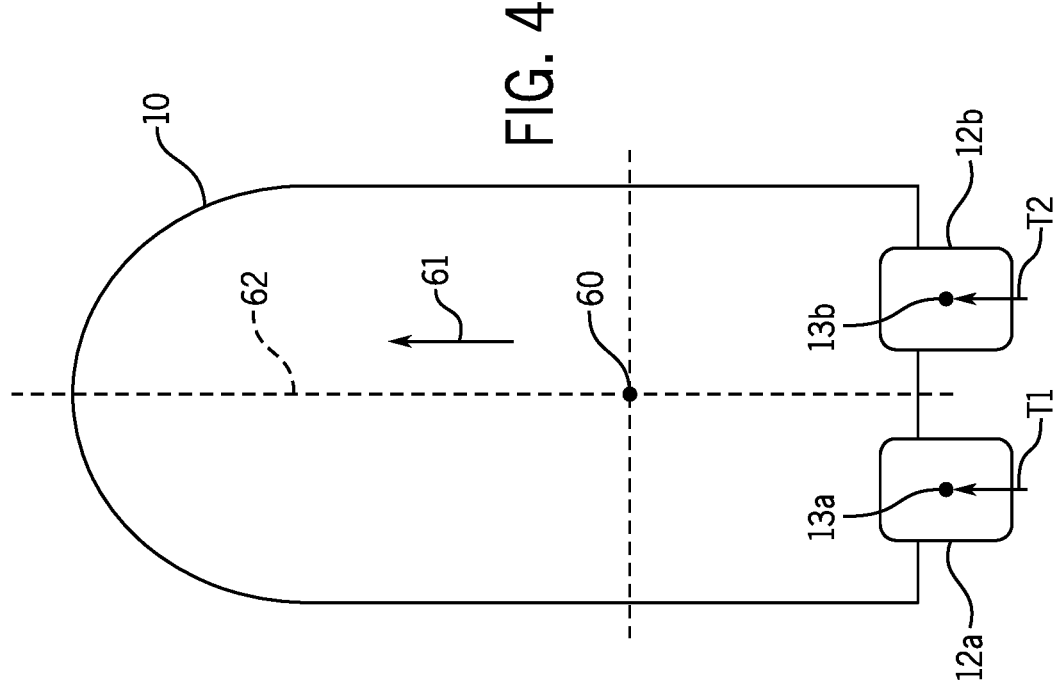
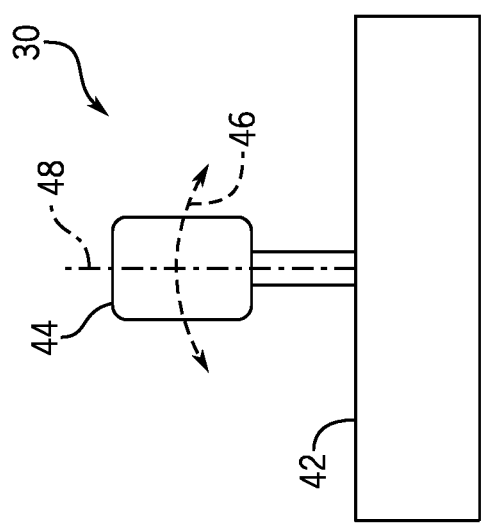
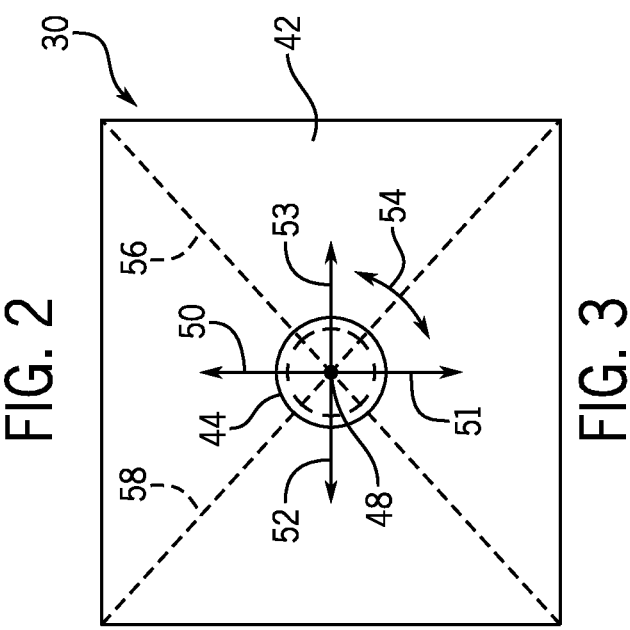

METHODS AND SYSTEMS FOR CONTROLLING LOW-SPEED PROPULSION OF A MARINE VESSEL

FIELD

The present disclosure relates to methods and systems for controlling movement of a marine vessel in a body of water, and more specifically to systems and methods for controlling low-speed propulsion of a marine vessel by a manually operable input device such as a joystick.

BACKGROUND

The following U.S. Patents and Applications provide background information and are incorporated herein by reference in entirety.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a method for controlling low-speed propulsion of a marine vessel powered by a marine propulsion system having a plurality of propulsion devices includes receiving a signal indicating a position of a manually operable input device movable to indicate desired vessel movement within three degrees of freedom, and associating the position of the manually operable input device with a desired inertial velocity of the marine vessel. A steering position command and an engine command are then determined for each of the plurality of propulsion devices based on the desired inertial velocity and the propulsion system is controlled accordingly. An actual velocity of the marine vessel is measured and a difference between the desired inertial velocity and the actual velocity is determined, where the difference is used as feedback in subsequent steering position command and engine command determinations.

Another embodiment of a method for controlling low-speed propulsion of a marine vessel powered by a marine propulsion system having a plurality of propulsion devices includes storing a vessel dynamics model in a memory of a controller, the vessel dynamics model representing an approximation of vessel dynamics for the marine vessel and, with the controller, receiving a signal indicating a position of a manually operable input device movable to indicate desired vessel movement within three degrees of freedom, and determining a desired inertial velocity of the marine vessel based on the position of the manually operable input device. The vessel dynamics model is utilized to calculate a surge command, a sway command, and/or a yaw command based on the desired inertial velocity. A steering position command and an engine command are determined for each of the plurality of propulsion devices based on the surge command, the sway command, and/or the yaw command, and each of the plurality of propulsion devices are automatically controlled based on the steering position command and the engine command for the respective propulsion device.

Various other features, objects, and advantages of the invention will be made apparent from the following description taken together with the drawings.

BRIEF DESCRIPTION OF THE DRAWINGS

The present disclosure is described with reference to the following Figures.

FIG. 2 is a side view of an exemplary used in conjunction with the marine vessel of the present disclosure.

FIG. 3 is a top view of the joystick.

FIG. 4 illustrates an arrangement of thrust vectors during forward movement of the marine vessel.

DETAILED DESCRIPTION

Figure 1:
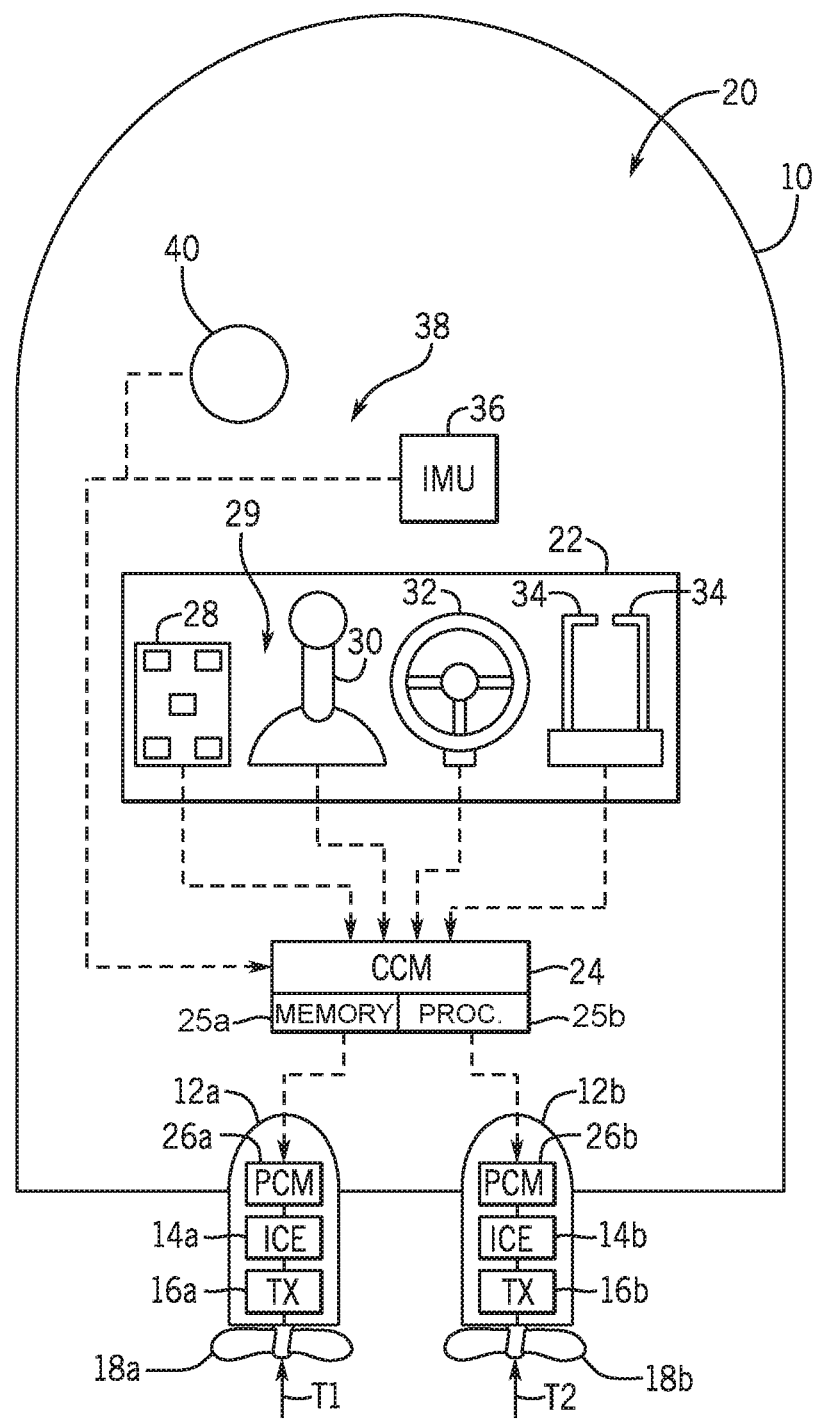
FIG. 1 is a schematic representation of a marine propulsion system on a marine vessel.

Current user input control systems for controlling low-speed propulsion of a marine vessel, such as systems employing joystick controls, utilize a "feed-forward" only software control strategy where the user inputs, such as via the joystick, produce a calibrated set of engine commands. This set of engine commands is developed and calibrated via a laborious process to generate a vessel response that is specific to the marine vessel on which it is installed. This vessel-specific calibration must be developed by an expert through a combination of physical measurements of a marine vessel, on-water testing and data collection for that marine vessel, and post-test analysis. This calibration is typically implemented as a map correlating engine and steering commands to joystick position, and such a map is distributed as part of a software load that is tailored to a specific vessel configuration—e.g., a specific combination of hull design and dimensions, engine size, number of engines, engine placement, and propeller type.

Though this customized joystick configuration process produces a joystick control system with desirable handling characteristics, the inventors have recognized that the calibration process for each vessel configuration is too labor intensive. Moreover, the inventors have recognized that current systems involving vessel configuration-specific calibrations require tracking and maintaining hundreds of unique configurations, which is burdensome and expensive. Additionally, the inventors have recognized that the calibration process, even when performed by expert technicians, introduces performance variation in the final product across a fleet of vessel configurations because human factors and personal preferences of the experts come in to play in creating and fine-tuning the calibration.

Upon recognition of the foregoing problems and challenges in the relevant field, the inventors developed the disclosed system that eliminates the need for vessel configuration-specific calibration and enables the provision of a unified control scheme across a fleet of marine vessels. The system and method correlate joystick commands with inertial velocity values for the marine vessel, and such inertial velocity values can be utilized for marine vessels having a wide variety of configurations. In one embodiment, the control system is a model-based system. A command model computes a desired inertial velocity based on joystick position, where the same command model can be used for multiple different vessel configurations. The command model maps user inputs, such as joystick position, to desired inertial velocity values, such as a desired surge velocity, a desired sway velocity, and/or a desired yaw velocity. The desired inertial velocity is then used to determine a steering position and an engine command for each of the plurality of propulsion devices.

In one embodiment, a second model is utilized to approximate the vessel dynamics for the particular marine vessel—e.g., a vessel dynamics model may be created and stored within the controller that approximates the vessel dynamics based on characteristics of the marine vessel, such as length, beam, and weight thereof. The vessel dynamics model is used to solve for a surge command, a sway command, and/or a yaw command that achieve the desired inertial velocity for the particular marine vessel.

By utilizing this model-based control architecture, the need for on-water testing and vessel personality development is eliminated while preserving highly accurate control systems providing desirable handling characteristics and a vessel response that is intuitive to the user. Customization of the disclosed system and method for a particular vessel configuration requires only physical traits of the vessel, such as engine location and a few size traits of the hull. These are known traits of the marine vessel, and thus the model customization can be done offline and requires only minimal expertise and time.

In certain embodiments, the vessel dynamics model may be incorporated in a closed-loop control system where the output of the vessel dynamics model, namely the surge command, sway command, and/or yaw command are compared to control feedback from one or more inertial and/or navigation sensors, wherein the steering position and engine command are calculated based on the output of the vessel dynamics model as well as feedback from the sensors. Thereby, closed-loop control is effectuated over vessel translation and yaw velocities, which are computed using a combination of sensors, such as accelerometers, gyros, magnetometers, and a global positioning system (GPS). In other embodiments, the model-based control may be implemented in a feed-forward control strategy, where outputs from the vessel dynamics model are utilized to determine a steering position command and engine command for each of the plurality of propulsion devices. Moreover, the feed-forward strategy can be utilized as a backup control strategy in the event of a failure of one or more of the feedback sensors, thereby providing a default control state that remains very drivable and safe for a user. The engine and steering commands generated based on the output of the vessel dynamics model will result in an actual vessel velocity that is very close to the desired inertial velocity, and the feedback is only used to correct for uncertainties in the model and for wind and current.

FIG. 1 shows a marine vessel 10 equipped with a propulsion system 20 configured according to one embodiment of the disclosure. The marine vessel 10 is capable of operating, for example, in a joysticking mode, among other modes, as described hereinbelow. The vessel 10 has first and second propulsion devices 12a, 12b that produce first and second thrusts T1, T2 to propel the vessel 10, as will be more fully described hereinbelow. As illustrated, the first and second propulsion devices 12a, 12b are outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also includes various control elements that comprise part of the marine propulsion system 20. The marine propulsion system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory 25a and a programmable processor 25b. As is conventional, the processor 25b is communicatively connected to the memory 25a comprising a computer-readable medium that includes volatile or nonvolatile memory upon which computer readable code is stored. The processor 25b can access the computer readable code and upon executing the code carries out functions as described hereinbelow.

In other examples of the marine propulsion system 20, only one control module is provided for the system rather than having a CCM and separate PCMs. In other examples, one CCM is provided for each propulsion device, and/or additional control modules are provided for controlling engine speed and functions separately from steering and trim of the propulsion devices. For example, the PCMs 26a, 26b may control the engines 14a, 14b and transmissions 16a, 16b of the propulsion devices 12a, 12b, while additional thrust vector modules (TVMs) may control their orientation. In other examples of the marine propulsion system 20, the vessel control elements are connected via wireless communication rather than by a serially wired CAN bus. It should be noted that the dashed lines shown in FIG. 1 are meant to show only that the various control elements are capable of communicating with one another, and do not represent actual wiring connecting the control elements, nor do they represent the only paths of communication between the elements.

The operation console 22 includes a number of user input devices, such as a keypad 28, a joystick 30, a steering wheel 32, and one or more throttle/shift levers 34. Each of these devices inputs commands to the controller 24. The controller 24, in turn, communicates with the first and second propulsion devices 12a, 12b by communicating with the PCMs 26a, 26b. The controller 24 also receives information from an inertial measurement unit (IMU) 36. The IMU 36 may comprise a portion of a global positioning system (GPS) 38 which, in the example shown, also comprises a GPS receiver 40 located at a pre-selected fixed position on the vessel 10, which provides information related to the global position of the vessel 10. In other embodiments, the IMU 36 may comprise part of an inertial navigation system (INS). Signals from the GPS receiver 40 (or INS) and/or the IMU 36 are provided to the controller 24. In one example, the IMU 36 is an inertial navigation system (INS) consists of a MEMS gyroscope, or a MEMS angular rate sensor, a MEMS accelerometer, and a magnetometer, which are used together to calculate velocity and heading of the marine vessel relative to magnetic north. In other embodiments, the motion and angular position (including pitch and roll) may be sensed by a different INS configuration or an attitude heading reference system (AHRS) that provides 3D orientation of the marine vessel 10 by integrating gyroscopic measurements, accelerometer data, and magnetometer data. Signals from the GPS receiver 40 and/or the IMU (or INS) 36 are provided to the controller 24.

The steering wheel 32 and the throttle/shift levers 34 function in a conventional manner, such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively.

A manually operable input device, such as the joystick 30, can also be used to provide signals to the controller 24. The joystick 30 can be used to allow the operator of the vessel 10 to manually maneuver the vessel 10, such as to achieve translation or rotation of the vessel 10, as will be described below. It should be understood that in alterative examples, the various components 28, 30, 32, 34 may communicate directly with the PCMs 26a, 26b or may communicate with one or more central control modules. Referring to FIGS. 2 and 3, operation of the joystick 30 will now be described. FIG. 2 is a simplified schematic representation of the joystick 30 which provides a manually operable input device which can be used to provide a signal that is representative of a desired movement within three degrees of freedom, selected by an operator, of the vessel 10. The example in FIG. 2 shows a base portion 42 and a handle 44 that is movable by a user. In a typical application, the handle 44 is movable horizontally as represented by arrow 46 and is also rotatable about an axis 48. It should be understood that the joystick handle 44 is movable by tilting it about its connection point in the base portion 42 in virtually any direction. Although arrow 46 is illustrated in the plane of the drawing in FIG. 2, a similar type of movement is possible in other directions that are not parallel to the plane of the drawing.

In a joysticking mode, the user may operate the joystick 30 to command the rotational and/or translational movements described hereinabove with respect to FIGS. 2 and 3. The joysticking mode may have various activation and operation requirements, and is generally configured to control low-speed propulsion operation of the marine vessel. For example, the controller 24 (e.g. CCM) may implement a maximum speed threshold requirement prior to permitting activation of the joysticking mode. For instance, the joysticking mode may be only activatable when the vessel speed is less than 15 mph, or less than 10 mph. Alternatively or additionally, activation of the joysticking mode may depend on position(s) of the throttle/shift lever 34 and/or steering wheel 32, and/or based on engine speed. In one example, the joysticking mode may only be activated when the throttle/shift lever 34 is in the neutral detent position and the engine speed is at idle. It should be understood that the joysticking mode is also intended to cover embodiments in which other types of input devices are used to provide fore/aft and lateral translation requests, for example, a keypad with fore/aft and left/right buttons.

FIG. 3 is a top view of the joystick 30. The handle 44 can move, as indicated by arrow 46 in FIG. 2, in various directions with respect to a horizontal plane generally represented by arrows 50, 51, 52 and 53. However, it should be understood that the handle 44 can move in any direction relative to its axis 48 and is not limited to the two lines of movement represented by arrows 50, 51, 52 and 53. In fact, the movement of the handle 44 has a virtually infinite number of possible paths as it is tilted about its connection point within the base portion 42. The handle 44 is also rotatable about axis 48, as represented by arrow 54. Movement of the joystick is detected by one or more sensors, such as a 3-axis joystick sensor module that senses movement of the joystick with respect to the horizontal plane and rotational movement of the joystick about its vertical axis and produces a signal accordingly to indicate a position of the joystick. Note that there are many different types of joystick devices that can be used to provide a signal that is representative of a desired movement of the vessel 10, as expressed by the operator of the marine vessel through movement of the handle 44. For example, a keypad, trackball, and/or other similar input device that allows inputs in four or more directions could be used.

With continued reference to FIG. 3, it can be seen that the operator can demand a purely linear movement either toward port as represented by arrow 52 or starboard as represented by arrow 53, a purely linear movement in a forward direction as represented by arrow 50 or reverse direction as represented by arrow 51, or any combination of two of these directions. In other words, by moving the handle 44 along dashed line 56, a linear movement toward the right side and forward or toward the left side and rearward can be commanded. Similarly, a linear movement along line 58 could be commanded. It should be understood that the operator of the marine vessel can also request a combination of sideways or forward/reverse linear movement in combination with a rotation as represented by arrow 54. Any of these possibilities can be accomplished through use of the joystick 30, which communicates with the controller 24 and eventually with the PCMs 26a, 26b. The magnitude, or intensity, of movement represented by the position of the handle 44 is also provided as an output from the joystick 30. In other words, if the handle 44 is moved slightly toward one side or the other away from the neutral position (which is generally the centered and vertically upright position with respect to the base portion 42), the commanded thrust in that direction is less than if, alternatively, the handle 44 was moved by a greater magnitude away from its neutral position. Furthermore, rotation of the handle 44 about axis 48, as represented by arrow 54, provides a signal representing the intensity of desired movement. A slight rotation of the handle 44 about axis 48 would represent a command for a slight rotational thrust about a preselected point on the vessel 10. A greater magnitude rotation of the handle 44 about its axis 48 would represent a command for a higher magnitude of rotational thrust.

In FIG. 4, the vessel 10 is illustrated schematically with its center of rotation (COR) 60, which can be a calibrated preselected point on the vessel 10. In other examples, point 60 could instead be an instantaneous center of gravity. The COR 60 is a function of several factors which comprise the speed of the vessel 10 as it moves through the water, the azimuth angle of the hull velocity with respect to the water, the weight distribution of the load contained within the vessel 10, and the degree to which the vessel 10 is disposed below the waterline. The location of the COR 60 can be empirically determined for various sets of conditions. For purposes of the below explanation, the point 60 will be referred to as the COR, although it will be understood by a person of ordinary skill that similar calculations can be carried out using the center of gravity.

First and second steering axes, 13a and 13b, are illustrated for the first and second propulsion devices 12a, 12b. The first and second propulsion devices 12a, 12b are rotatable about the first and second steering axes, 13a and 13b, respectively. The ranges of rotation of the first and second propulsion devices 12a, 12b may be symmetrical with respect to a centerline 62 of the vessel 10. The positioning method of the present disclosure rotates the first and second propulsion devices 12a, 12b about their respective steering axes 13a, 13b, adjusts their operation in forward or reverse gear, and adjusts the magnitude of their thrusts T1, T2 (for example, by adjusting engine speed and/or propeller pitch or transmission slip) in an efficient manner that allows rapid and accurate maneuvering of the vessel 10. The rotation, gear, and thrust magnitude of one propulsion device 12a can be varied independently of the rotation, gear, and thrust magnitude of the other propulsion device 12b.

FIG. 4 illustrates a thrust orientation that is used when it is desired to move the vessel 10 in a forward direction represented by arrow 61, with no movement in either a right or left direction and no rotation about its COR 60. This is done by rotating the first and second propulsion devices 12a, 12b into an aligned position, in which their thrust vectors T1 and T2 are parallel to one another. As can be seen in FIG. 4, the first and second thrust vectors, T1 and T2, are equal in magnitude and are directed in the same forward direction. This creates no resultant rotation about the COR 60 and no resultant movement in either the left or right directions. Movement in the direction represented by arrow 61 results from all of the vector components (described further herein below) of the first and second thrust vectors T1, T2 being resolved in a direction parallel to arrow 61. The resultant thrust components parallel to arrow 61 are additive and together provide net forward thrust in the direction of arrow 61 to the vessel 10.

Figure 5:
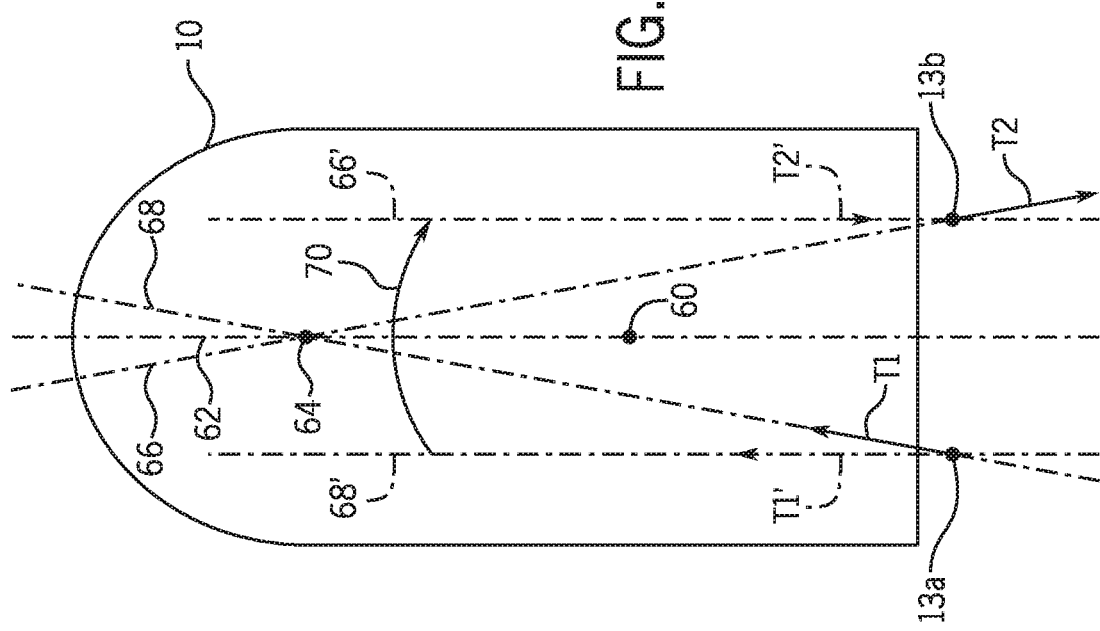
FIGS. 5 and 6 show exemplary arrangements of thrust vectors used to rotate the marine vessel about its center of rotation.
Figure 6:
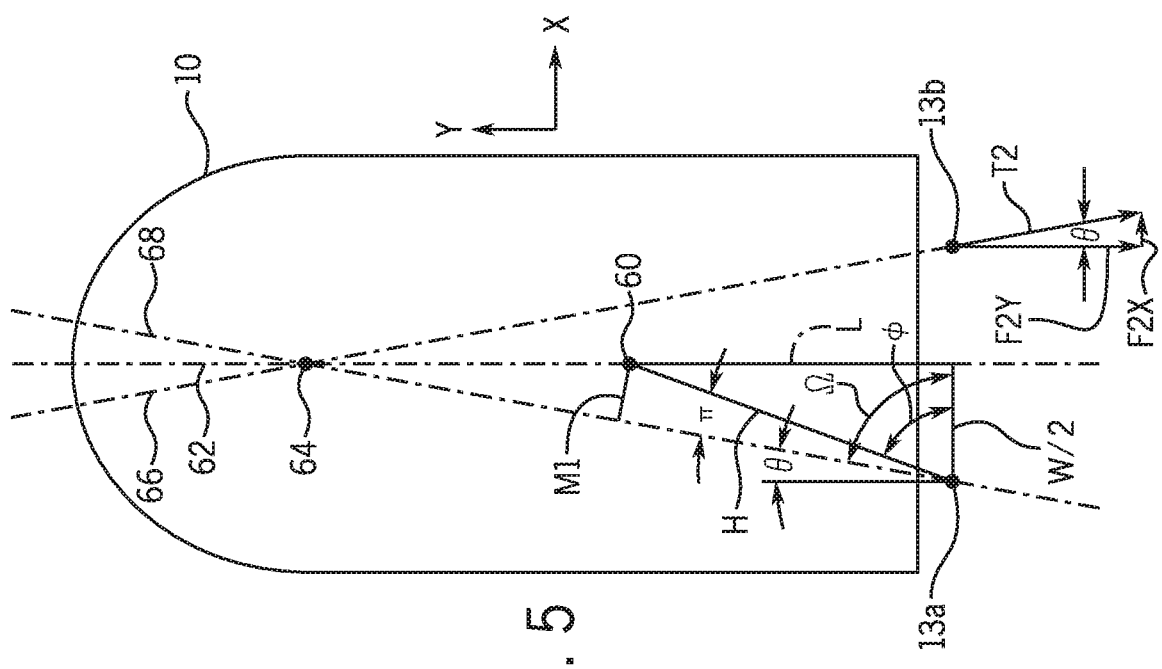

As illustrated in FIGS. 5 and 6, when a rotation of the vessel 10 is desired in combination with linear movement, the first and second propulsion devices 12a, 12b are rotated about the respective first and second steering axes 13a, 13b to steering angles $\theta$ with respect to the centerline 62 so that their thrust vectors intersect at a point on the centerline 62. Although thrust vector T1 is not shown in FIG. 5 for purposes of clarity (see FIG. 6 for its magnitude and direction), its associated line of action 68 is shown intersecting with a line of action 66 of thrust vector T2 at a point 64. Because the point 64 is not coincident with the COR 60, an effective moment arm M1 exists with respect to the thrust T1 produced by the first propulsion device 12a. The moment about the COR 60 is equivalent to the magnitude of the thrust vector T1 multiplied by dimension M1. Moment arm M1 is perpendicular to dashed line 68 along which the first thrust vector T1 is aligned. As such, it is one side of a right triangle which also comprises a hypotenuse H. It should also be understood that another right triangle in FIG. 5 comprises sides L, W/2, and the hypotenuse H. So long as the propulsion devices 12a, 12b are rotated about their respective steering axes 13a, 13b by the same angle $\theta$, a moment arm M2 (not shown for purposes of clarity) of equal magnitude to moment arm M1 would exist with respect to the second thrust vector T2 directed along line 66.

With continued reference to FIG. 5, those skilled in the art will recognize that the length of the moment arm M1 can be determined as a function of steering angle $\theta$; angle $\Phi$; angle $\pi$; the distance between the first and second steering axes 13a and 13b, which is equal to W in FIG. 5; and the perpendicular distance L between the COR 60 and a line extending between the first and second steering axes 13a, 13b. The length of the line extending between the first steering axis 13a and the COR 60 is the hypotenuse H of a right triangle and can easily be determined using the Pythagorean theorem given L and W, which are known and saved in the control module's memory. The magnitude of $\theta$ is calculated as described hereinbelow with respect to equations 1-4. The magnitude of angle $\Omega$ is 90−$\theta$. The magnitude of angle $\Phi$ is equivalent to the arctangent of the ratio of length L to the distance between the first steering axis 13a and the vessel's centerline 62, which is identified as W/2. The length of the moment arm M1 can be mathematically determined by the controller 24 using the length of line H and the magnitude of angle π (which is Ω−Φ).

The thrust vectors T1, T2 each resolve into vector components in both the forward/reverse and left/right directions. The vector components, if equal in absolute magnitude to each other, may either cancel each other or be additive. If unequal in absolute magnitude, they may partially offset each other or be additive; however, a resultant force will exist in some linear direction. For purposes of explanation, FIG. 5 shows the vector components of the second thrust vector T2. As illustrated, second thrust vector T2 is oriented along line 66, which is at steering angle θ with respect to the centerline 62. The second thrust vector T2 can be resolved into components, parallel and perpendicular to centerline 62, that are calculated as functions of the steering angle θ. For example, the second thrust vector T2 can be resolved into a reverse-directed force F2Y and a side-directed force F2X by multiplying the second thrust vector T2 by the cosine of θ and the sine of θ, respectively. The vector components of the first thrust T1 can also be resolved into forward/reverse and side directed components in a similar manner. Using these relationships, the vector components FX, FY of the net thrust produced by the marine propulsion system 20 can be calculated by adding the respective forward/reverse and left/right vector components of T1 and T2:

$$FX = T1(\sin(\theta)) + T2(\sin(\theta)) \quad (1)$$

$$FY = T1(\cos(\theta)) - T2(\cos(\theta)) \quad (2)$$

Note that in the example of FIGS. 5 and 6, T1 has positive vector components in both the X and Y directions, while T2 has a positive vector component in the X direction and a negative vector component in the Y direction, which is therefore subtracted from the Y-directed vector component of T1. The net thrust acting on the vessel 10 can be determined by vector addition of FX and FY.

Turning to FIG. 6, a moment (represented by arrow 70) can also be imposed on the vessel 10 to cause it to rotate about its COR 60—i.e., to effectuate yaw velocity. The moment 70 can be imposed in either rotational direction: clockwise (CW) or counterclockwise (CCW). The rotating force resulting from the moment 70 can be applied either in combination with a linear force on the vessel 10 or alone. In order to combine the moment 70 with a linear force, the first and second thrust vectors T1, T2 are aligned in generally opposite directions with their respective lines of action 68, 66 intersecting at the point 64 illustrated in FIG. 6. Although the construction lines are not shown in FIG. 6, effective moment arms M1, M2 exist with respect to the first and second thrust vectors T1, T2 and the COR 60. Therefore, a moment is exerted on the vessel 10 as represented by arrow 70. If the thrust vectors T1, T2 are equal to each other in magnitude, are exerted along lines 68 and 66 respectively, and are symmetrical about the centerline 62 and in opposite directions, the net component forces parallel to the centerline 62 are equal to each other and therefore no net linear force is exerted on the vessel 10 in the forward/reverse direction. However, the first and second thrust vectors T1, T2 also resolve into forces perpendicular to the centerline 62, which in this example are additive. As a result, the marine vessel 10 in FIG. 6 will move to the right as it rotates in a clockwise direction in response to the moment 70.

If, on the other hand, it is desired that the moment 70 be the only force on the vessel 10, with no lateral movement in the forward/reverse or left/right directions, alternative first and second thrust vectors, represented by T1' and T2' in FIG. 6, are aligned parallel to each other along dashed lines 68' and 66', which are parallel to the centerline 62. The first and second thrust vectors T1', T2' are of equal magnitude and opposite direction. As a result, no net force is exerted on the vessel 10 in a forward/reverse direction. Because angle θ for both thrust vectors T1' and T2' is equal to 0 degrees, no resultant force is exerted on the vessel 10 in a direction perpendicular to the centerline 62. As a result, a rotation of the vessel 10 about its COR 60 is achieved with no linear movement in either the forward/reverse or the left/right directions.

With reference to FIGS. 2-6, it can be seen that movement of the joystick handle 44 can be used by the operator of the vessel 10 to represent virtually any type of desired movement of the vessel 10 within three degrees of freedom—i.e., surge, sway, and yaw. In response to receiving a signal from the joystick 30, an algorithm determines whether or not a rotation (shown by moment 70) about the COR 60 is requested by the operator. If forward translation with no rotation is requested, the first and second propulsion devices 12a, 12b are oriented so that their thrust vectors align in a forward parallel orientation, as shown in FIG. 4, and so long as the magnitude and direction of T1 are equal to that of T2, the vessel 10 will travel in a forward direction. If, on the other hand, the signal from the joystick 30 indicates that a rotation about the COR 60 is requested, the first and second thrust vectors T1, T2 are directed along lines 68 and 66 that do not intersect at the COR 60, but instead intersect at another point 64 along the centerline 62. As shown in FIGS. 5 and 6, this intersection point 64 can be forward from the COR 60. The thrusts T1 and T2 shown in FIG. 6 result in a clockwise rotation (shown by moment 70) of the vessel 10. Alternatively, if the first and second propulsion devices 12a, 12b are rotated so that they intersect at a point along the centerline 62 that is behind the COR 60, an opposite effect could be realized, all else being equal. It should also be recognized that, with an intersection point 64 forward of the COR 60, the directions of the first and second thrust vectors T1, T2 could be reversed to cause a rotation of the vessel 10 in a counterclockwise direction.

It should be noted that the steering angles of the propulsion devices 12a, 12b need not be the same. For example, the first propulsion device 12a can be steered to angle $\theta_1$ with respect to the centerline 62, while the second propulsion device 12b can be steered to angle $\theta_2$. When an input to the joystick 30 is made, the controller 24 will determine the net thrust and the net moment desired of the marine propulsion system 20. It can be seen, therefore, that T1, T2, $\theta_1$, and $\theta_2$ can thereafter be calculated by the controller 24 using the geometric relationships described hereinabove according to the following equations:

$$FX = T1(\sin(\theta_1)) + T2(\sin(\theta_2)) \quad (1)$$

$$FY = T1(\cos(\theta_1)) - T2(\cos(\theta_2)) \quad (2)$$

$$MCW = (W/2)(T1(\cos(\theta_1))) + (W/2)(T2(\cos(\theta_2))) \quad (3)$$

$$MCCW = L(T1(\sin(\theta_1))) + L(T2(\sin(\theta_2))) \quad (4)$$

$$MT = MCW - MCCW \quad (5)$$

where FX and FY are the vector components of the known target linear thrust, MT is the known total target moment (including clockwise moment MCW and counterclockwise moment MCCW) about the preselected point, and L and W/2 are also known as described above. The controller 24 then solves for the four unknowns (T1, T2, $\theta_1$, and $\theta_2$) using the four equations, thereby determining the steering angles, shift positions, and thrust magnitudes of each propulsion device 12a, 12b that will achieve the desired movement of the vessel 10. Note that equations 1-5 are particular to the thrust arrangements shown in FIGS. 5 and 6, and different vector components would contribute to clockwise or counterclockwise rotation and to forward/reverse or right/left translation given thrusts in different directions.

The above principles regarding resolution of the thrust vectors T1, T2 into X components and Y components in order to achieve lateral movement, rotational movement, or a combination of the two are the basis of a maneuvering algorithm of the present method. This maneuvering algorithm used in response to commands from the joystick 30 while in joysticking mode.

In current systems, the joystick 30 position input is associated with a target linear thrust and a target moment about a preselected point based on a map stored in memory associating joystick position with target thrust and target moment. As described above, creation of this vessel-specific map requires extensive calibration procedures to be performed by an expert, which is a labor and resource intensive process. Furthermore, this system requires tracking and maintenance of hundreds or even thousands of vessel-specific maps.

The disclosed system and method alleviate such problems and challenges. The disclosed system and method associate user input, such as a sensed joystick position, with a desired inertial velocity of the marine vessel. The desired inertial velocity can be uniform across all or many vessel configurations, and thus one map or set of maps associating joystick position with desired inertial velocity values can be installed across various marine vessel configurations. The disclosed model-based control strategy is based on extensive vessel dynamics and handling qualities research conducted by the inventors and utilizes a generic vessel model developed and tested by the inventors to calculate feed-forward commands based on the desired inertial velocity value and in a way that can be easily applied to a wide range of marine vessel configurations.

Figure 7:
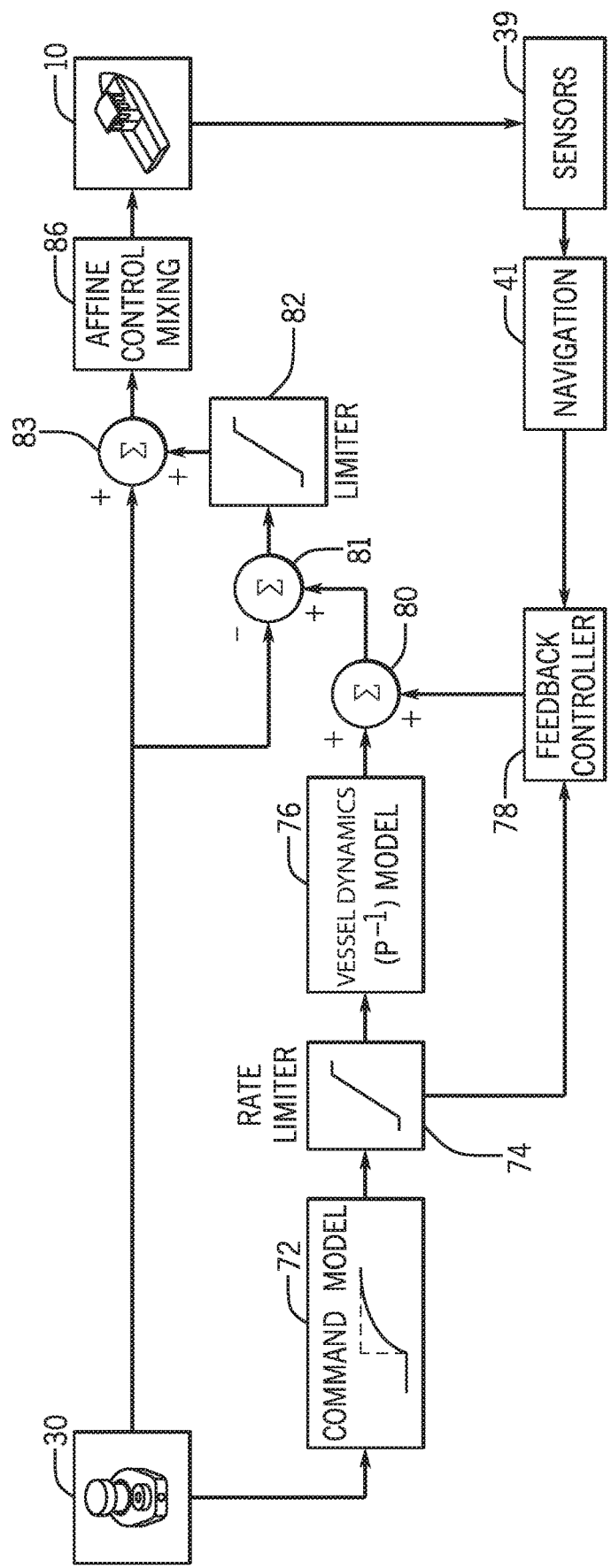
FIG. 7 is a block diagram illustrating an exemplary method for controlling low-speed propulsion of the marine vessel based on joystick inputs.

FIG. 7 is a flowchart schematically depicting one embodiment of a control method for controlling low-speed propulsion of a marine vessel, such as in joysticking mode. In the depicted embodiment, the control strategy is a closed-loop algorithm utilizing the vessel dynamics model to both calculate feed-forward commands and design a feedback controller that compares the desired inertial velocity to an actual measured velocity of the marine vessel in order to provide accurate control that accounts for situational factors in the marine environment—e.g. wind and current—and any inaccuracies or uncertainties in the model. An affine control mixing strategy is utilized to convert surge (fore/aft) velocity commands and yaw velocity commands into values that can be used to control the propulsion devices, including engine command values (e.g. engine speed or throttle control values) and steering commands (e.g. angular steering position). Exemplary embodiments of each aspect of this control strategy are subsequently discussed.

Signals from the joystick 30 (e.g., a percent deflection +/−100% in each of the axis directions) are provided to the command model 72, which computes the desired inertial velocity based on the joystick position. The inertial velocity may include translational velocity values and/or yaw velocity values. Command module 72 takes raw joystick position information and generates a desired inertial velocity, such as a desired surge, sway, and yaw response of the marine vessel. This architecture allows for easy setup and configuration of how fast the vessel will translate and/or turn in response to a user input. In certain embodiments, the command model may be tunable by a user to adjust how aggressively the propulsion system 20 will respond to user inputs. For example, secondary inputs may be provided on the operation console 22, such as button inputs or inputs on the keypad 28 or joystick 30, may allow a user to input preference as to how the vessel will respond to the joystick inputs, such as to increase or decrease the desired inertial velocity values associated with the joystick positions and/or to select stored profiles or maps associated with user input values to desired velocity values. For example, the user inputs may allow a user to instruct an increase or decrease in the aggressiveness of the velocity response and/or to increase or decrease a top speed that the full joystick position (e.g. pushing the joystick to its maximum outer position) effectuates.

For example, the command model 72 may be a map of positions of the joystick to inertial velocity values, such as associating each possible position of the joystick to a target surge velocity, a target sway velocity, and/or a target yaw velocity. For example, the neutral, or centered, position in the joystick is associated with a zero inertial velocity. In certain examples where the control system is a closed-loop system, feedback control may be utilized to maintain the vessel at its current position, similar to station keeping functionality. Accordingly, when the position of the joystick is equal to the neutral, or centered, position, the steering command and the engine command are determined so as to maintain the marine vessel at its current position, including to counteract momentum of the marine vessel and/or the effects of any wind or current. Thus, during joystick mode the marine vessel 10 only moves in response to and in accordance with user input via the joystick.

Output from the command model 72, such as desired surge, sway, and yaw velocities, are passed through a rate limiter 74. This enforces a maximum acceleration of the marine vessel, for user comfort and safety, and accounts for fault modes, such as limits on propulsion or steering commands due to faults in the engine or steering system.

The output of the rate limiter 74 is provided to the vessel dynamics model 76, which in the depicted embodiment is an inverse plant model. The same plant model may be used for designing the feedback controller to solve for the feedback gains. The plant model is derived from a combination of on-water testing-based parameter identification and computational fluid dynamics. Based thereon, a generic low-speed vessel model is developed, which is a non-dimensional model covering a range of vessel hull characteristics and factors that affect vessel dynamics. For example, the model may be developed by utilizing computational fluid dynamics to analyze parametric study data on a wide range of vessel hulls that cover the range of vessel hull dimensions for which the control system will be implemented. Plant modeling techniques may then be utilized to generate a mathematical model, a generic low-speed vessel model, of the vessel dynamics at low speeds for the range of vessel hulls. For example, the model may represent the vessel dynamics for each of the exemplary set of vessel hulls operating at a range of speeds achievable during joysticking within a ten percent accuracy requirement as compared to the parametric study data. The model can be non-dimensionalized to create a generic low-speed vessel model where vessel size and weight characteristics are represented as a set of coefficients that can be inputted to create a vessel dynamics model for any vessel hull in the range covered by the model. For example, the set of coefficients for a vessel hull may include a vessel length, a vessel beam, and a vessel weight. Additionally, this generic low-speed vessel model may include propulsion data, such as configured such that propulsion device size, type, and location can be inputted (in addition to the hull size and weight characteristics) as part of generating the vessel dynamics model 76 for a marine vessel.

In one example, the generic low-speed vessel model receives the coefficients for the vessel hull and yields three equations for that marine vessel configuration comparing vessel speed, vessel acceleration, and joystick demand for each of the surge, sway, and yaw axes of motion:

$$Added\_Mass\_Deriv * acceleration = Damping\_Deriv * velocity + Control\_Power\_Deriv * joystick\_pct$$

These equations are inverted and utilized as the vessel dynamics model 76—e.g., an inverse plant model—to solve for commands, such as joystick percent commands for the marine vessel that effectuate the desired inertial velocity. For example, the inverse plant model 76 may generate a surge command, a sway command, and a yaw command based on the desired inertial velocity values provided by the command model 72 (filtered by the rate limiter 74). Based on the logic above, the vessel dynamics model 76 may be configured to calculate the joystick percent (i.e., command percent) required to achieve the desired inertial velocity according to the following:

$$Joystick\_pct = (Added\_Mass\_Deriv * acceleration - Damping\_Deriv * velocity) / Control\_Power\_Deriv$$

where the velocity is the value outputted by the command model 72, and the acceleration is the derivative of the command model output.

In a feed-forward command regime, the output of the vessel dynamics model 76 can be utilized to control the propulsion devices—i.e., inputted to the affine control mixer 86 to generate engine and steering commands. Accordingly, the command model 72, rate limiter 74, vessel dynamics model (e.g., inverse plant model) 76, and affine control mixer 86 can be utilized, without the feedback portion of the system depicted in FIG. 7, to control propulsion of the marine vessel 10 in a joysticking mode. This control strategy, which results in a very drivable and safe propulsion system 20, can be implemented on its own as a control strategy or can be implemented as a default state when the feedback portion of a closed-loop control system is inoperable (such as due to failure of navigation systems or sensors).

In the depicted closed-loop control strategy, feedback control is provided by a feedback controller 78, which receives information about the actual vessel velocity from one or more sensors and/or navigation systems on the marine vessel. For example, the feedback controller 78 may receive information about the inertial movement of the marine vessel from one or more sensors 39, such as from the IMU 36. The output of the one or more sensors 39 is interpreted by a navigation system 41, such as a GPS 38 or an inertial navigation system. The navigation system 41 provides an actual inertial velocity (e.g. translational velocity and yaw velocity) that can be compared to the output of the command model 72 at the feedback controller 78, and such information can be utilized to refine the command values so as to more accurately effectuate the desired inertial velocity by accounting for inaccuracies in the inverse plant model and disturbances in the environment (e.g., wind and waves). The feedback controller 78 may be designed utilizing the vessel dynamics model in order to provide appropriate feedback gains based on the dynamics of the particular vessel configuration.

The output of the feedback controller 78 and the inverse plant model 76 are combined at summing point 80. Referring to the inverse plant model example described above calculating joystick percent based on desired inertial velocity, the feedback controller 78 would likewise provide output in terms of a joystick percent, and such output is added to the joystick percent value outputted by the vessel dynamics model 76. The summed output is then compared to the joystick position information at summing point 81 (e.g., to the percent deflection value). The summed output is again subject to a limiter 82, which limits the feedback authority in order to limit authority of the feedback controller and account for fault modes. The output of the limiter 82 is summed with the joystick values at summing point 83. That summed value is provided to the affine control mixer 86, which generates a total X direction command and a total Y-direction command, e.g., the X and Y components of the total thrust command for each propulsion device. From there, engine, steering, and shift commands for the propulsion devices are generated.

The affine mixing strategy implemented at mixing module 86 accomplishes a blending and smoothing of surge, sway, and yaw commands. An exemplary embodiment of affine mixing is described in more detail below, which utilizes the number of installed propulsion devices, the physical locations of those propulsion devices, and a distance of those physical locations to the estimated COR 60 of the marine vessel 10. The affine mixing strategy generates a total thrust command, including a total X direction thrust and a total Y direction thrust, from which an engine command, a steering position command, and a shift command can be generated for each propulsion device 12 in the propulsion system 20 (e.g. see FIG. 8 and description below).

Figure 10:
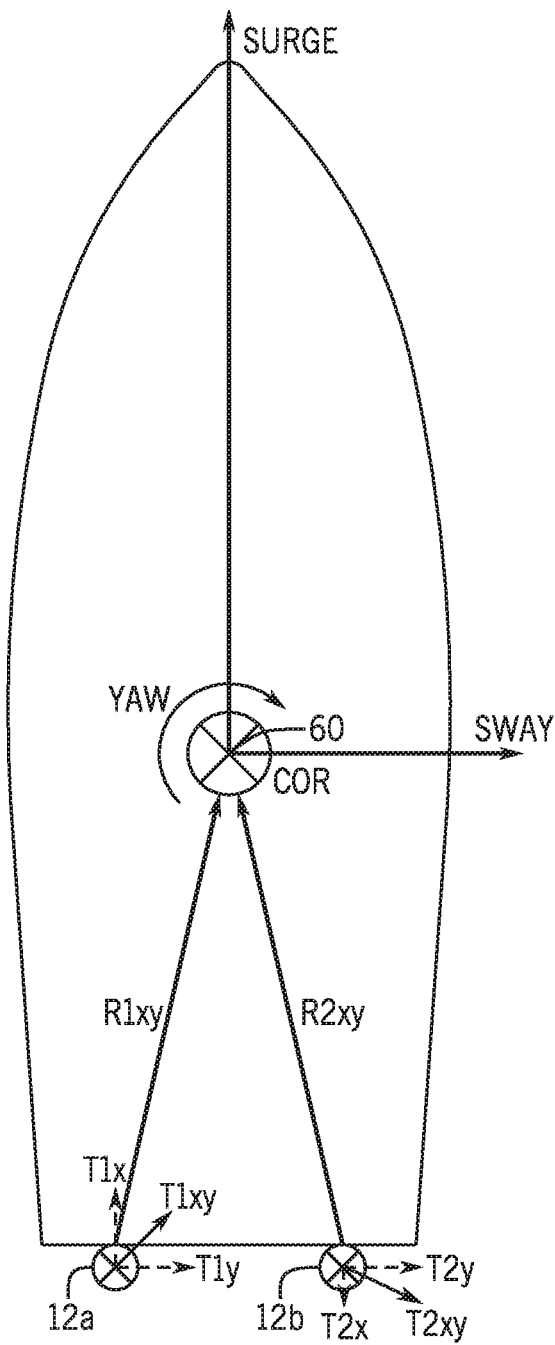
FIG. 10 illustrates exemplary surge, sway, and yaw commands for the marine vessel and resulting thrust vectors calculated for each of two propulsion devices.

For each propulsion device, a two-dimensional (X, Y) unit normal vector between the location of the propulsion devices 12a, 12b and the COR 60. The unit normal vectors are represented in FIG. 10 as $R1_{xy}$ and $R2_{xy}$. The unit normal vector is then used to create a conversion matrix that is applied to the surge, sway, and yaw commands resulting from summing point 83 in order to calculate a total X direction command and a total Y-direction command. For example, the surge, sway, and yaw commands may be thrust or joystick percent commands which are then converted into a total X thrust command and a total Y thrust command for each propulsion device 12a, 12b. From there, an engine command (e.g. throttle or engine RPM control value(s), a steering position command, and a shift command are generated for each propulsion device and provided to each respective controller, therefore (e.g., PCMs 26a, 26b), based on the geometry of the X and Y commands.

The affine mixing strategy may be accomplished according to the following set of equations:

$$R_{unorm} = \frac{R_n}{\text{norm}(R_n)} \tag{6}$$

$$[Xcmd_n \, Ycmd_n] = \tag{7}$$
$$\begin{bmatrix} R_{unorm}(x) & \text{sign}(R_{unorm}(Y)) \times R_{unorm}(X) & \text{sign}(R_{unorm}(Y)) \\ R_{unorm}(Y) & \text{sign}(R_{unorm}(Y)) \times R_{unorm}(Y) & 0 \end{bmatrix} \times \begin{bmatrix} surge\_cmd \\ sway\_cmd \\ yaw\_cmd \end{bmatrix}$$

-continued $$Engine_n = \text{norm}(Xcmd_n, Ycmd_n) \quad (8)$$

$$Shift_n = \text{sign}(Xcmd_n) \quad (9)$$

$$Steer_n = -\text{sign}(Xcmd_n) \times \text{atan2}(Xcmd_n, Ycmd_n) \quad (10)$$

where $R_{unorm}$ is the unit normal vector for each propulsion device 12a, 12b provided by equation 6, the total X thrust command and total Y thrust command for each propulsion device is provided by equation 7, the engine, shift, and steering commands are calculated for each propulsion device according to equations 8-10. The total X direction and Y direction commands calculated for each propulsion device according to equation 7 utilize the conversion matrix based on the unit normal vector multiplied by the surge, sway, and yaw commands. This is schematically illustrated at FIG. 10, where the arrows representing exemplary surge, sway, and yaw commands are transformed into a total X direction thrust command and a total Y direction thrust command, from which the thrust vectors $T1_{xy}$ and $T2_{xy}$ for each of the propulsion devices 12a, 12b are calculated, respectively. According to equation 8, the engine command for each propulsion device 12a, 12b is calculated as the normal of the total X and Y commands for the propulsion device. The shift command (i.e. forward or reverse) is determined based on the sign (i.e., positive or negative) of the total X command. The steering position command for each propulsion device is determined from the second-argument arctangent of the Y direction thrust command and the X direction thrust command according to equation 10.

Figure 8:
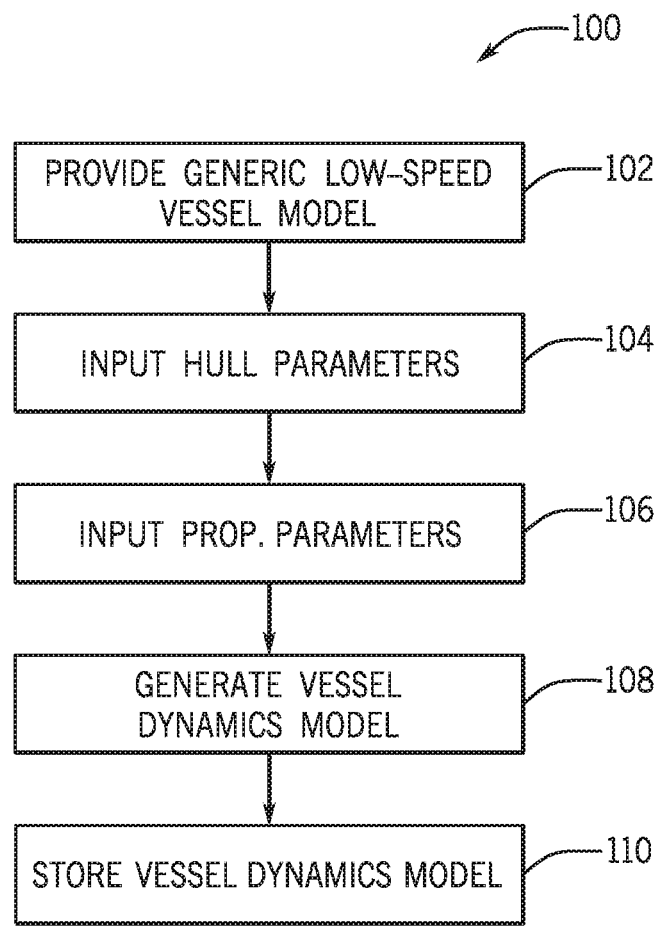
FIGS. 8 and 9 are flowcharts exemplifying methods, or portions thereof, of controlling low-speed propulsion of a marine vessel in accordance with the present disclosure.
Figure 9:
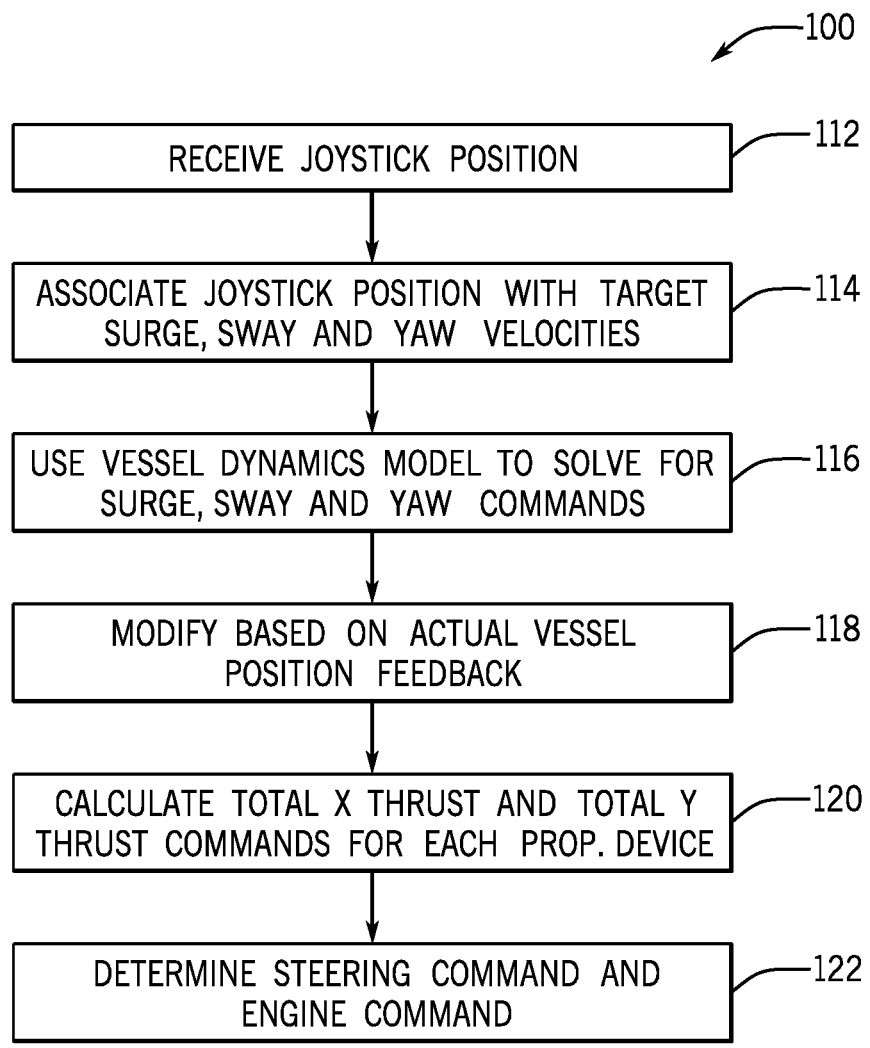

FIGS. 8 and 9 are flowcharts representing methods 100, or portions thereof, for controlling propulsion according to exemplary embodiments of the present disclosure. FIG. 8 depicts exemplary method steps for generating a vessel dynamics model from a generic low-speed vessel model is provided at step 102, such as the non-dimensionalized plant model of the vessel dynamics at low speeds for a range of vessel hulls, as described above. The generic low-speed vessel model includes a set of coefficients for the hull parameters, such as vessel length, vessel beam, and vessel weight. Such values of a particular marine vessel are inputted for the coefficients at step 104. Parameters regarding the propulsion device are inputted at step 106, such as the size, type, and location of each of the plurality of propulsion devices 12a, 12b. The propulsion data can then be appended to vessel hull model based on the parameters inserted at step 104 in order to generate the vessel dynamics model at step 108 for the particular vessel. The vessel dynamics model is stored in memory accessible to the controller 24 (e.g. in memory 25a of the CCM) so that it can be utilized to generate the surge, sway, and yaw velocity commands based on the desired inertial velocity. For example, the model may be inverted and stored such that the inertial velocity input is used to solve for the velocity commands that would result in the desired inertial velocity.

FIG. 9 depicts one embodiment of a method 100 for controlling propulsion of the marine vessel utilizing the vessel dynamics model. A signal indicating a joystick position is received at step 112. Step 114 is executed to associate the joystick position with the target surge, target sway, and target yaw velocity. For example, such association may be generated utilizing the command model 72 described above. The vessel dynamics model is then used to generate velocity commands at step 116. Namely, the target surge velocity, the target sway velocity, and/or the target yaw velocity are used as input to the vessel dynamics model in order to generate the surge command, sway command, and yaw command that would result in the inputted target inertial velocities. The actual vessel position is measured, such as by an IMU and/or GPS system, and the actual vessel position is utilized as feedback at step 118 to modify the surge, sway, and yaw commands. The total X direction thrust and total Y direction thrust commands are then determined for each propulsion device at step 120, such as utilizing the affine control mixing strategy described above. Steering commands and engine commands are then determined at step 122 based on the X thrust and Y thrust commands.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method for controlling low-speed propulsion of a marine vessel powered by a marine propulsion system including a plurality of propulsion devices, the method comprising:

generating a vessel dynamics model representing an approximation of vessel dynamics for the marine vessel;

receiving a signal indicating a position of a manually operable input device movable to indicate desired vessel movement within three degrees of freedom, wherein the manually operable input device is a joystick movable with respect to a horizontal plane and rotatable about a vertical axis;

associating the position of the manually operable input device with a desired inertial velocity of the marine vessel, wherein the desired inertial velocity includes one or more of a target surge velocity and a target sway velocity based on a position of the joystick with respect to the horizontal plane, and target yaw velocity based on a rotational position of the joystick;

determining a steering position command and an engine command for each of the plurality of propulsion devices based on the desired inertial velocity, wherein determining the steering position command and the engine command includes utilizing the vessel dynamics model to solve for at least one of a surge command, a sway command, and a yaw command based on the desired inertial velocity;

automatically controlling the propulsion system based on the steering position command and the engine command;

measuring an actual velocity of the marine vessel; and determining a difference between the desired inertial velocity and the actual velocity and using the difference as feedback in subsequent steering position command and engine command determinations.

2. The method of claim 1, wherein the desired inertial velocity is determined based on a map correlating positions of the joystick to inertial velocity values.

3. The method of claim 2, wherein the map is tunable by a user to adjust responsiveness of the propulsion system to movements of the joystick.

4. The method of claim 1, wherein a neutral position of the joystick is associated with a desired inertial velocity of zero; and
wherein when the position of the joystick is equal to the neutral position, the steering position command and the engine command are determined so as to maintain the marine vessel at its current GPS location and current heading.

5. The method of claim 1, wherein the vessel dynamics model is an inverse plant model based on at least a length, a beam, and a weight of the marine vessel.

6. The method of claim 1, further comprising providing a generic low-speed vessel model having coefficients for vessel length, vessel beam, and vessel weight;
wherein generating the vessel dynamics model includes scaling the generic low-speed vessel model based on a length, a beam, and a weight of the marine vessel.

7. The method of claim 1, further comprising determining the steering position command and the engine command for each propulsion device based on the surge command, the sway command, and the yaw command, a number of propulsion devices on the marine vessel, and a location of each of the plurality of propulsion devices with respect to a center of rotation of the marine vessel.

8. The method of claim 7, further comprising:
determining a two-dimensional unit normal vector for each propulsion device based on the location of each of the plurality of propulsion devices with respect to the center of rotation;
calculating a total X thrust command and a total Y thrust command for each of the plurality of propulsion devices based on the surge command, the sway command, and the yaw command and the unit normal vector for the respective propulsion device;
wherein the steering position command, the engine command, and a shift position command are determined for each of the plurality of propulsion devices based on the total X thrust command and the total Y thrust command for the respective propulsion device.

9. A method for controlling low-speed propulsion of a marine vessel powered by a marine propulsion system including a plurality of propulsion devices, the method comprising:
storing a vessel dynamics model in a memory of a controller, the vessel dynamics model representing an approximation of vessel dynamics for the marine vessel;
with the controller:
receiving a signal indicating a position of a manually operable input device movable to indicate desired vessel movement within three degrees of freedom;
determining a desired inertial velocity of the marine vessel based on the position of the manually operable input device;
utilizing the vessel dynamics model to calculate a surge command, a sway command, and/or a yaw command based on the desired inertial velocity;
determining a steering position command and an engine command for each of the plurality of propulsion devices based on the surge command, the sway command, and/or the yaw command; and
automatically controlling each of the plurality of propulsion devices based on the steering position command and the engine command for the respective propulsion device.

10. The method of claim 9, wherein the vessel dynamics model is an inverse plant model based on at least a length, a beam, and a weight of the marine vessel.

11. The method of claim 9, further comprising:
providing a generic low-speed vessel model having coefficients for vessel length, vessel beam, and vessel weight;
generating the vessel dynamics model by scaling the generic low-speed vessel model based on a length, a beam, and a weight of the marine vessel.

12. The method of claim 9, further comprising determining the steering position command and the engine command for each propulsion device based on the surge command, the sway command, and the yaw command, a number of propulsion devices on the marine vessel, and a location of each of the plurality of propulsion devices with respect to a center of rotation of the marine vessel.

13. The method of claim 12, further comprising determining a two-dimensional unit normal vector for each propulsion device based on the location of each of the plurality of propulsion devices with respect to the center of rotation;
calculating a total X thrust command and a total Y thrust command for each of the plurality of propulsion devices based on the surge command, the sway command, and the yaw command and the unit normal vector for the respective propulsion device;
wherein the steering position command, the engine command, and a shift position command are determined for each of the plurality of propulsion devices based on the total X thrust command and the total Y thrust command for the respective propulsion device.

14. The method of claim 9, further comprising:
measuring an actual velocity of the marine vessel; and
determining a difference between the desired inertial velocity and the actual velocity and using the difference as feedback in subsequent steering position command and engine command determinations.

15. The method of claim 9, wherein the manually operable input device is a joystick movable with respect to a horizontal plane and rotatable about a vertical axis; and
wherein the desired inertial velocity includes one or more of a target surge velocity and a target sway velocity based on a position of the joystick with respect to the horizontal plane, and target yaw velocity based on a rotational position of the joystick.

16. The method of claim 15, wherein the desired inertial velocity is determined based on a map correlating positions of the joystick to inertial velocity values.

17. A marine propulsion system for controlling low-speed propulsion of a marine vessel, the system comprising:
a plurality of propulsion devices steerable to propel the marine vessel with respect to first, second, and third perpendicular axes;
a joystick movable by a user to indicate desired vessel movement of the marine vessel within three degrees of freedom;
a controller configured to:
store a vessel dynamics model representing an approximation of vessel dynamics for the marine vessel;
receive a signal indicating a position of the joystick;
associate the position of the joystick with a desired inertial velocity;

utilize the vessel dynamics model to solve for a surge command, a sway command, and/or a yaw command based on the desired inertial velocity;

determine a steering position command and an engine command for each of the plurality of propulsion devices based on the surge command, the sway command, and/or the yaw command; and automatically control each of the plurality of propulsion devices based on the steering position command and the engine command for the respective propulsion device.

18. The system of claim 17, further comprising at least one of a global positioning system (GPS) and an inertial measurement unit (IMU);

wherein the controller is further configured to:

measure an actual velocity of the marine vessel with the GPS or the IMU; and determine a difference between the desired inertial velocity and the actual velocity and use the difference as feedback for subsequent steering position command and engine command determinations.

* * * * *